March 25, 1947. H. W. SANFORD ET AL 2,417,842
COOKING STOVE
Filed March 17, 1942 5 Sheets-Sheet 1
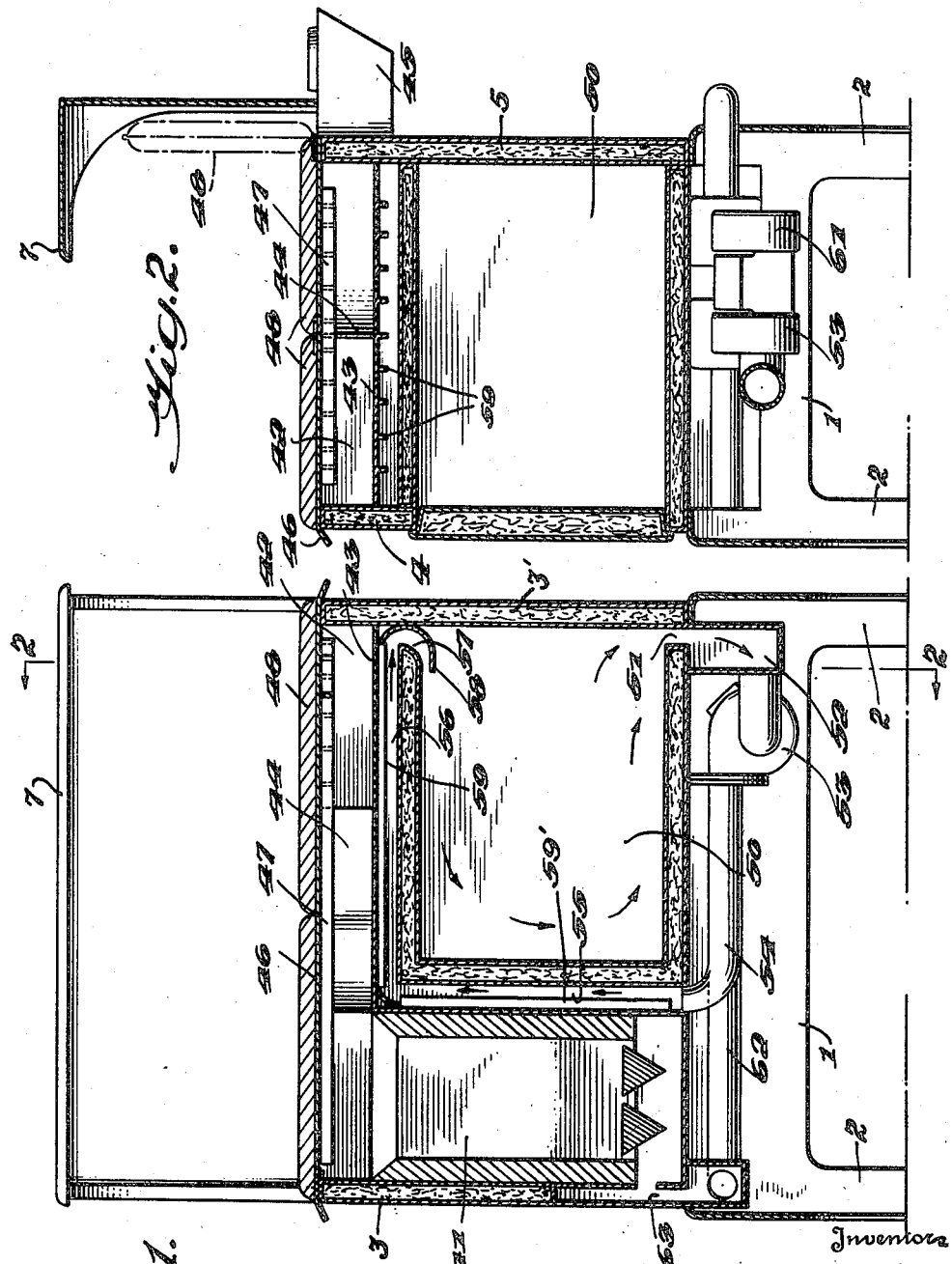

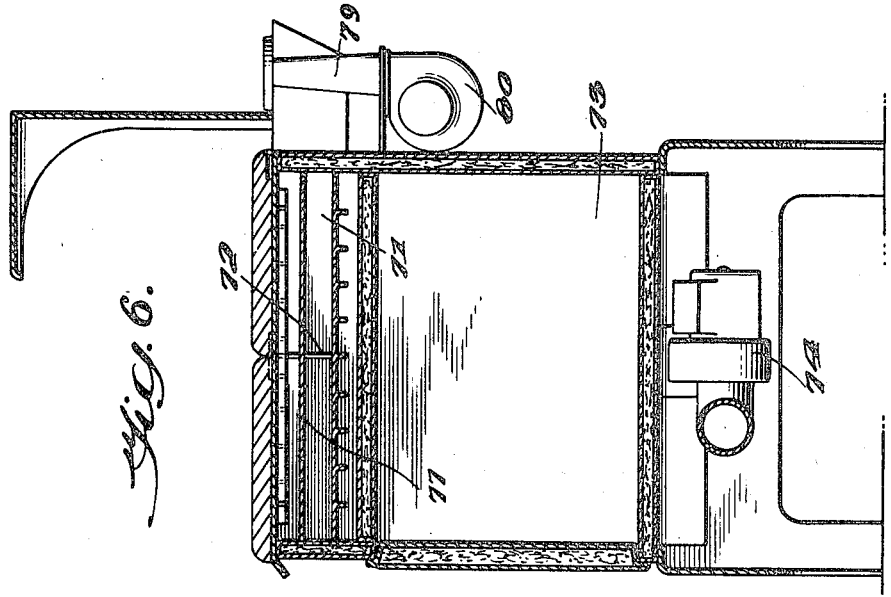
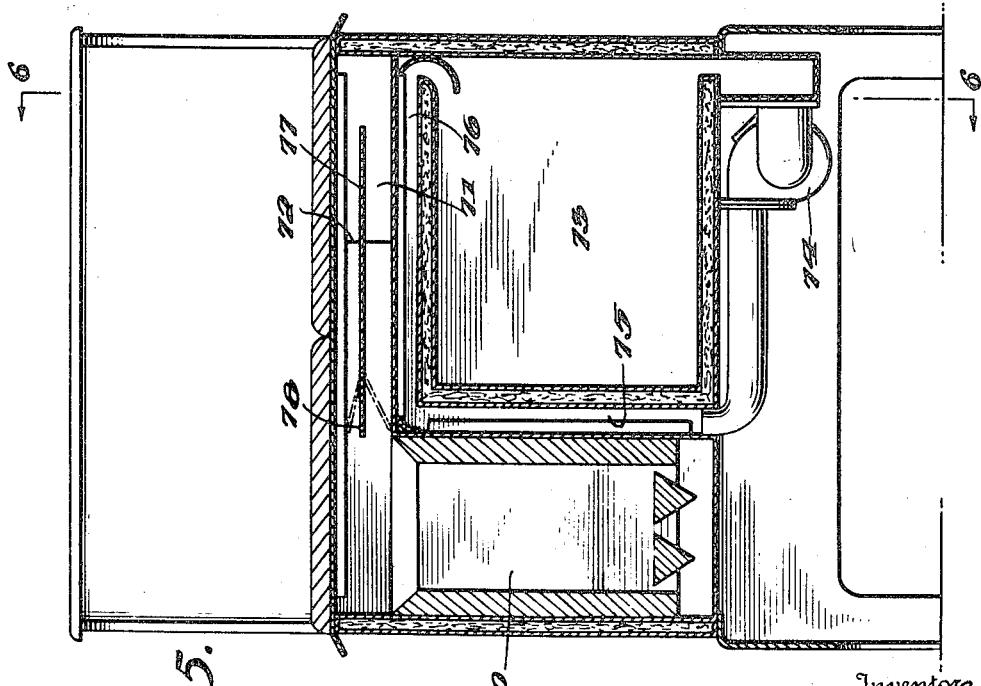

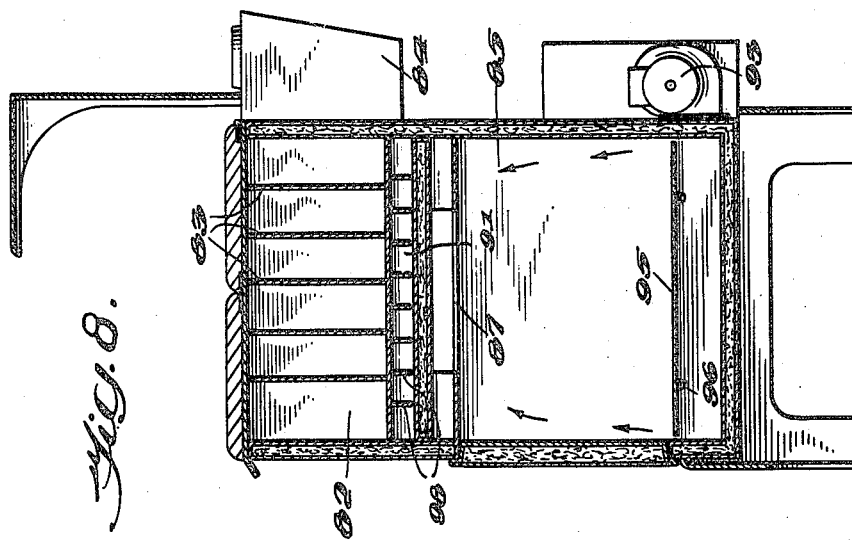
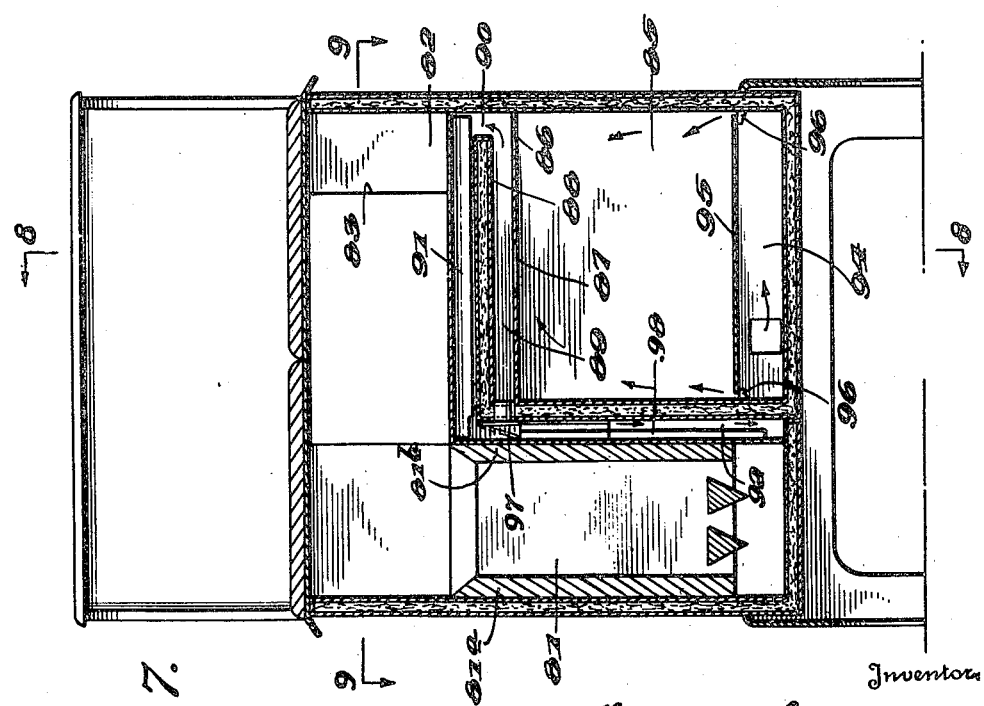

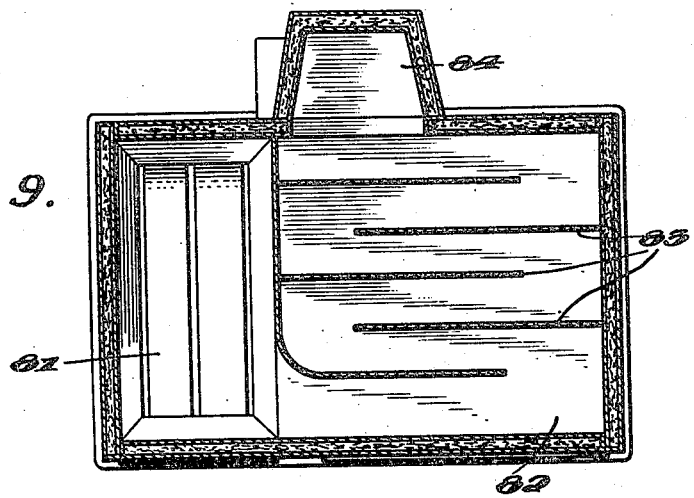
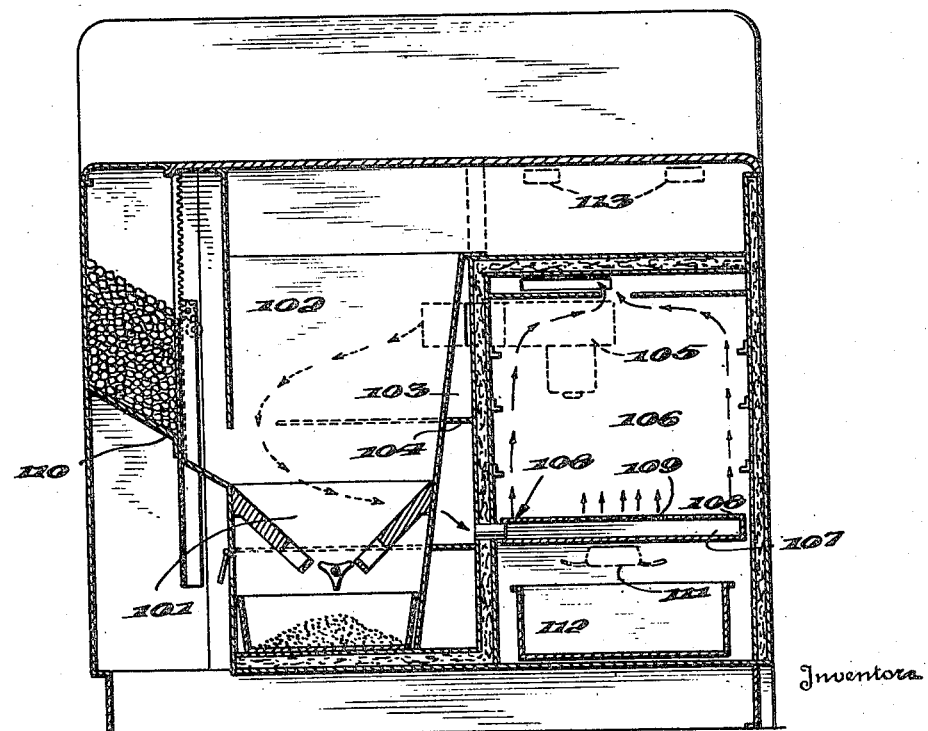

Patented Mar. 25, 1947

2,417,842

UNITED STATES PATENT OFFICE 2,417,842

COOKING STOVE

Hugh W. Sanford and William Porter Biddle, Jr., Knoxville, Tenn.; said Biddle, Jr., assignor to said Sanford Application March 17, 1942, Serial No. 435,088

23 Claims. (Cl. 126—1)

This invention relates to improvements in cooking stoves, particularly of the character having ovens for the baking of food products.

It has been customary heretofore in cooking stoves to circulate the flue gas constituting the heating media substantially around the several sides of the oven transversely thereof, passing from the fire box over the top and down the opposite side of the oven to an outlet flue at the bottom, depending upon radiation of the heat into the oven for the heating thereof. This is objectionable because it produces non-uniform heating within the oven, and the bottom portions of the flues frequently get clogged up which reduces the efficiency of the stove very materially.

An object of the invention is to increase the efficiency of the cooking stove by producing more uniform heat throughout the oven, while permitting initial heating of the oven to higher temperature in much shorter time than has been possible heretofore.

A further object of the invention is to reduce the cost of the stove by simplifying the construction thereof, while obtaining efficient heat radiation from the heating means for heating the oven without waste.

These objects are accomplished by recirculating the air out of and into the oven and through the same, thus obtaining uniform heat distribution throughout the oven, and heating the air thus withdrawn from the oven at a point externally thereof in a manner that is efficient and which tends to simplify and materially improve the construction.

The manner in which the air is recirculated makes possible the elimination of the conventional passage of the hot gas from the heating means around the side and below the oven, after passing over the top of the oven from the heating means to an outlet located beneath the oven. By recirculating the air in the oven, it is possible to heat this air efficiently for quick uniform heating of the oven, by applying the heating action along two surfaces, as one side and the top of the oven, thus obtaining adequate and efficient heat radiation while dispensing with the ducts that are customarily used for circulating the heating media downward on the opposite side of the oven and beneath the same.

This simplifies the construction materially and reduces the cost of the stove. It makes possible also the efficient insulation of the outside walls and doors of the stove so that heat will not be lost by radiation in the kitchen, and when desired, the top likewise may be completely insulated to confine the heat substantially to the oven.

It is preferable in this invention to obtain recirculation of the air from and into the oven by power means, such as a fan, the speed of which may be regulated thermostatically to vary or control the temperature of the oven, and it may be stopped automatically upon the opening of the door. A combined fan and blower serves not only for recirculating the air for heating, but also to distribute the heat uniformly throughout the oven thus obtaining uniform baking conditions therein.

The invention may be embodied in different forms utilizing the characteristics thereof, some of which are shown in the accompanying drawings, in which:

Fig. 1 is a vertical sectional view through a cooking stove embodying one form of the invention;

Fig. 2 is a cross section thereof on the line 2—2 of Fig. 1;

Fig. 5 is a vertical section embodying another form of the invention;

Fig. 6 is a cross section thereof on the line 6—6 of Fig. 5;

Fig. 7 is a vertical section of yet another form of stove embodying this invention;

Fig. 8 is a cross section thereof on the line 8—8 of Fig. 7;

Fig. 9 is a horizontal section therethrough on the line 9—9 of Fig. 8; and

Fig. 10 is a vertical section of a still further modified form of stove embodying this invention.

Figure 3:
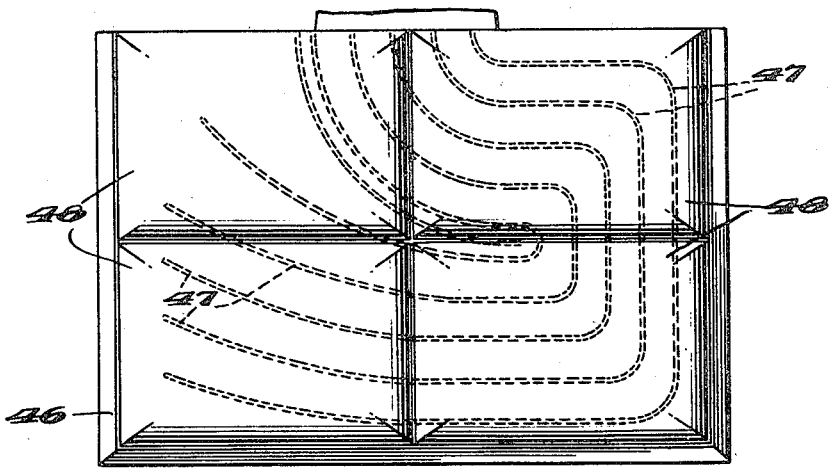
Fig. 3 is a top plan view of this form of stove embodying this invention.
Figure 4:
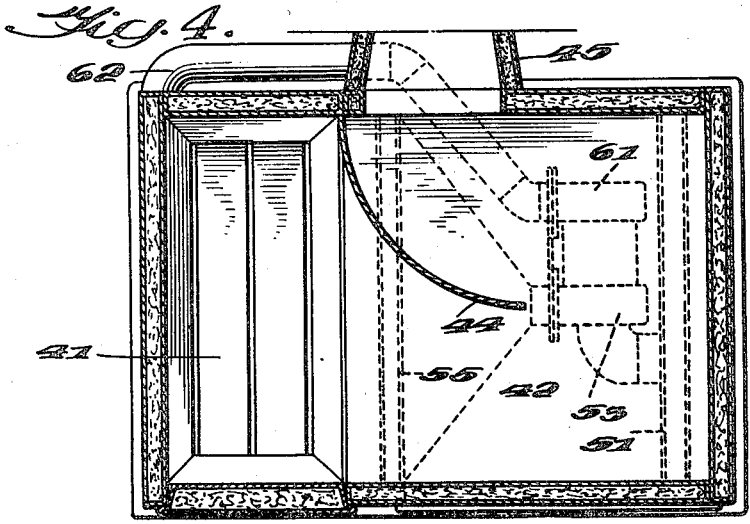
Fig. 4 is a horizontal sectional view therethrough.

Referring to the form shown in Figs. 1, 2 and 3, the stove is shown as constructed of a base 1, supported on legs 2. Upstanding from the base 1 are insulated opposite side walls 3 and 3', front wall 4, and back wall 5 which support a cooking top 46 thereon. A high shelf is shown at 7 and may be used where desired.

The form of the invention shown in Figs. 1 to 4 is illustrative of one application of this invention. The fire box is shown at 41, although mounted at a very low point in the stove with a combustion chamber thereabove, from which the flue gas or heating media is discharged into a top flue 42 closed at the bottom by a plate 43. The top flue 42 is divided by a partition 44 around the end of which the flue gases are circulated before discharge to a flue outlet 45.

The cooking top 46 extends over the top flue 42 and the fire box 41. Fins 47 are fixed on the under face of the cooking top 46 and extend generally in the intended direction of travel of the flue gases to the outlet 45, as shown in Fig. 3.

Above the cooking top 46 are folding insulated top covers 48 which may be disposed in the full line positions of Figs. 1 and 2, when it is desired to confine the heat within the stove and when the top surface thereof is not being used, and yet the covers may be moved to the dotted line position in Fig. 2, when using the cooking top 46. This has the advantage of keeping the kitchen cool during hot weather when the top of the stove is not being used and also obtaining more efficient utilization of the heat for the oven alone.

The oven is designated generally 50 and is shown as substantially insulated throughout its surrounding walls. In this form, the oven 50 has an outlet 51 extending along one side thereof at the bottom, into an air chamber 52, from which the air is withdrawn by the suction side of a motor-driven fan 53. The fan 53 discharges into a duct 54, which extends to a vertical heating chamber 55 between the side of the oven 50 and the fire box 41 in heat exchange relation with the latter.

The upper end portion of the heating chamber 55 is in open communication with a horizontal duct 56 that extends therefrom to an entrance opening 57 at the upper portion of the oven 50. A deflector 58 extends beneath this entrance opening to direct the heated air currents therefrom toward the opposite side of the oven for recirculation therethrough before being discharged at the outlet 51. The under face of the plate 43 is provided with spaced parallel fins 59 extending therealong lengthwise of the duct 56, and similar fins 59' extend along the fire box wall of the heating duct 55, for increasing the heat radiation to the air passing through said ducts, thus obtaining maximum heat radiation from the heating media. The low position of the fire box 41, together with the fins 59', provide a very efficient method of obtaining as much heat as possible from the fire box walls.

A second fan is shown at 61 which may be driven by the same motor as the fan 53, but having an outside air inlet. The fan 61 discharges into an air duct 62, extending to an air passageway 63, opening into the bottom portion of the fire box 41, along the side and beneath the grates thereof, for supplying forced draft to the fire box.

The form of stove shown in Figs. 5 and 6 is similar in its general construction to that illustrated in Figs. 1 to 4, particularly as to the relation of the fire box and oven and the manner of recirculating the air for heating.

The fire box 70 discharges into a top flue 71 having a partition 72 therein, around which the heating media passes in the top flue 71 to a smoke outlet 79 at the back of the stove.

The oven 73 has the air recirculated therefrom by a fan 74 at the bottom thereof, through heating ducts 75 and 76, respectively, discharging into the top of the oven, generally in the manner described in connection with Figs. 1 to 4.

The top flue is divided horizontally by a partition 77 which extends from a point adjacent the fire box to a point beyond the end of the partition 72. At the fire box end thereof, the partition 77 has a hinged damper 78 adapted to be moved to different positions between the points shown in dotted lines in Fig. 5. Thus all of the heat from the fire may be diverted to the cooking top, or all of the heat may be diverted for heating the air passing through the heating duct 76 for the oven. If desired, the heat may be divided between the respective functions mentioned in any desired ratio.

This construction also provides for induced smoke pipe draft, instead of the forced draft to the ash pit as shown in Figs. 1 to 4. This is accomplished by using a blower 80 connected with the smoke outlet 79 for forcing a draft through the smoke pipe connected therewith. When such induced draft is used, it is impossible to have any accidental leakage of smoke or products of combustion into the room through small cracks or holes in the fire box or flues of the stove, and insures the complete removal thereof through the smoke pipe.

In the form of the invention shown in Figs. 7 to 9, the fire box 81 discharges into a top flue 82 of appreciably increased height relative to the top flues shown in Figs. 1 to 6. The flue 82 is provided also with overlapping spaced partitions 83 extending from side to side thereof, as shown in Fig. 9, to provide a zigzag travel path for the products of combustion from the fire box 81 to the smoke outlet 84.

This construction involves somewhat different provision for the circulation of air through the oven. The oven is designated generally 85 and is closed at the top by a wall 86 having a central opening or slot 87 therein. The wall 86 is spaced from an insulated partition 88, with a chamber 89 therebetween which communicates through an opening 90 at the side of the stove with a heating duct or passageway 91 extending beneath and in heat exchange relation with the top flue 82. At its opposite side the heating duct 91 is in communication with a vertical heating duct 92, extending downwardly beside the fire box 81 in heat exchange relation therewith. The heating walls of the ducts 91 and 92 are provided preferably with parallel fins 98 extending longitudinally in said ducts, providing maximum heat radiation to the air passing therethrough.

The air is drawn out of the lower end portion of the duct 92 by a fan or blower 93 which forces it into a space 94 beneath the oven bottom 95. The bottom 95 is formed of a metal plate supported by lugs 96 from the sides of the oven and is held with its edges in spaced relation from the oven side walls, thus providing narrow slots around the bottom of the oven through which the air is forced upwardly at high velocity. This forms a margin of hot air entirely around the oven, that travels upwardly therethrough at sufficiently high velocity to entrain the air inside the oven and set up a circulation or condition of turbulence throughout the oven. The heated bottom gives off radiated and convected heat. This arrangement insures uniformity of heat substantially throughout the oven, producing uniformity of baking results therein.

A damper is shown at 97 which may be opened to the dotted line position indicated in Fig. 7, for admitting air directly from the chamber 89 into the upper portion of the vertical flue 92, when desired for low temperature heating of the oven.

As shown also in Fig. 7, the fire box 81 has a fire brick lining therearound, the side of which adjacent the outer wall of the stove is designated 81a, while the inner side thereof beside the heating duct 92, is designated 81b. The side 81b is shown appreciably thinner than normal, and thinner than the side 81a, said side 81b being as thin as permissible without being burned out when the oven fan is not operating. This circulating fan should be turned off by a suitable control switch when the oven is not being used. The thin inner side of the fire brick lining, together with its unusual vertical height adjacent to the oven, permit a great transfer of heat from the fire box to the air passing through the duct 92 alongside of the oven and movement of the said air in the said duct itself by removing the heat from the said lining 81b and from the steel plate inside of it permits this wall section to be thinner than otherwise and still stand the heat of the main combustion. By obtaining an unusual amount of heat from this side wall of the fire box and from the top oven plate, we are able to produce an efficient method of heating the oven rapidly to the desired temperatures without using ducts underneath the bottom oven plate or the side oven plate for the passage of the gases of combustion. The relatively thicker wall 81a retains the heat on the outer side.

It has been customary heretofore to construct fire boxes of cooking stoves of relatively long narrow and shallow boxes placed high up in the stove structure, close to the cooking top. This provides practically no available combustion space within which the volatiles given off by burning coal can be ignited, whereby they pass out of the stove without giving up the heat contained in such volatiles, resulting in a substantial loss of fuel. This condition also causes an accumulation of soot in the flues in the ordinary coal range.

In Fig. 10, is shown a construction in which the fire box proper is dropped down well toward the bottom of the stove structure, as indicated at 101. The fire box 101 is suspended in a vertical chamber 102, the front, right and back walls of which slope inwardly toward the bottom as shown. The chamber 102 is appreciably elongated vertically and forms a combustion chamber, providing ample space for the complete combustion of the volatiles liberated by the coal as it is burned in the fire box 101.

The combustion chamber 102 is surrounded by a heating chamber 103, having a baffle 104 therein for directing the circulation of air about the sides of the heating chamber 102 in heat exchange relation therewith, when this air is discharged into the upper portion of the heating chamber 103 by a fan or blower 105 which withdraws it from the upper portion of the oven 106, as shown by the arrows in Fig. 10.

From the heating chamber 103, the air is discharged into a distributing chamber 107 forming the bottom portion of the oven 106. The major portion of the air is discharged from the distributing chamber 107 through perforations 108 around the edges thereof. However, additional perforations 109 are provided at the center of the bottom thereof for discharge of a small amount of hot air, to prevent the accumulation of stagnant air in the bottom center of the oven.

The construction shown in Fig. 10 includes a mechanical coal feeding device designated generally 110 for regulating the supply of coal that is fed to the fire box 101 under suitable control. This feeding device will be claimed in a separate application.

The stove constructions herein set forth are adapted readily to other types of fuel than coal, without departing from the invention, merely by the substitution or addition of suitable burners. As shown in Fig. 10, merely by inserting a proper gas burner 111 beneath the oven bottom chamber 107, the oven is made into a two fuel "dual" oven. This chamber 107 is spaced from the surrounding oven walls with a space on each side for the heat from the gas burner to flow into the oven. Furthermore, with a gas burner in this position, the utensil drawer 112 would be converted into a broiler drawer. Similar gas burners can be installed beneath the cooking top as indicated at 113.

To convert the stove into a dual coal and electric oven, it would be necessary merely to install the usual electric oven elements at the bottom and top of the oven. Furthermore, the coal fire box can be removed from the combustion chamber, and an oil burner substituted therefor, providing an oil-gas, or oil-electric combination, as will be obvious.

By thus recirculating the air through the oven and to the heating means, it is not necessary for the flue to extend entirely around the oven as has been the practice heretofore. This reduces the cost of construction by reason of dispensing with the ducts at the right of and beneath the oven.

We claim:

1. In a cook stove, the combination of an oven, heating means externally of the oven and having a radiant heating wall surface enclosing the heating means at one side thereof, means for withdrawing air at the top of the oven and directing the same in heat exchange relation with the opposite side of said wall surface from the heating means for heating of the air thereby, and separate means for directing said heated air into the lower portion of the oven.

2. In a cook stove, the combination of an oven, heating means externally of the oven and having a radiant heating wall surface enclosing the heating means at one side thereof, means for withdrawing air at the top of the oven and directing the same in heat exchange relation with the opposite side of said wall surface from the heating means for heating of the air thereby, separate means for directing said heated air into the lower portion of the oven, and power means for forcing said withdrawing and introducing movements of the air and for circulating the air through the oven.

3. In a cook stove, the combination of an insulated oven having insulated surrounding walls enclosing an oven chamber and having an inlet and outlet respectively at the bottom and top of the oven, conduits externally of the insulated oven and connected with the respective inlet and outlet for directing air from the oven and returning air thereto, said conduits being in open communication with each other, and means located externally of the insulated oven for heating the air during passage through said conduits.

4. In a cook stove, the combination of an insulated oven having insulated surrounding walls enclosing an oven chamber and having an inlet and outlet respectively at the bottom and top of the oven, conduits externally of the insulated oven and connected with the respective inlet and outlet for directing air from the oven and returning air thereto, said conduits being in open communication with each other, means located externally of the insulated oven for heating the air during passage through said conduits, and power blower means for forcing an air circulation through the conduits from the outlet to the inlet of the oven and for recirculating the air through the oven.

5. In a cook stove, the combination of a cooking top, an oven disposed beneath the cooking top spaced therefrom, a fire box disposed beside the oven beneath the cooking top, said stove having a top flue in open communication with the fire box and extending over the top of the oven, said flue having an outlet directly therefrom, said fire box and flue forming heating means for the stove, the oven having outlet and inlet openings respectively at the bottom and top of the oven, conduits connected respectively with the openings and located externally of the oven, said conduits being in open communication with each other for recirculation of air from the outlet to the inlet of the oven, one of said conduits extending along the top flue in heat exchange relation therewith.

6. In a cook stove, the combination of a cooking top, an oven disposed beneath the cooking top spaced therefrom, a fire box disposed beside the oven beneath the cooking top, said stove having a top flue in open communication with the fire box and extending over the top of the oven, said flue having an outlet directly therefrom adjacent the top of the oven, said fire box and flue forming heating means for the stove, the oven having outlet and inlet openings respectively at the bottom and top of the oven, conduits connected respectively with the openings and located externally of the oven, said conduits being in open communication with each other for recirculation of air from the outlet to the inlet of the oven, one of said conduits extending along the top flue in heat exchange relation therewith and along the fire box in heat exchange relation therewith, said heating means having spaced fins thereon extending lengthwise of the last-mentioned conduit for radiating heat thereto, and power blower means for applying forced air circulation through the conduits and through the oven.

7. In a cook stove, the combination of a cooking top, an oven disposed beneath the cooking top, a fire box beside the oven and spaced a substantial distance beneath the cooking top, means forming a combustion chamber over the fire box and beneath the cooking top, with said chamber elongated vertically and arranged in heat exchange relation with the cooking top, a heating chamber externally of the combustion chamber in heat exchange relation therewith, means for circulating air from the oven into said heating chamber for heating therein, and separate means for circulating heated air from said heating chamber into the bottom portion of the oven for upward circulation therethrough.

8. In a cook stove, the combination of a cooking top, an oven disposed beneath the cooking top, a fire box beside the oven and spaced a substantial distance beneath the cooking top, means forming a combustion chamber above the fire box and beneath the cooking top and arranged in heat exchange relation with the cooking top, a heating chamber externally of the combustion chamber and partially surrounding the same, horizontally arranged baffles mounted in said heating chamber for circulating air laterally therethrough, a distributing chamber mounted in the lower portion of said oven and having outlets therearound, and means for circulating air from said oven into the heating chamber and from said heating chamber into said distributing chamber.

9. In a cook stove, the combination of an oven having surrounding walls and bottom, an air chamber beneath the oven bottom and having means of communication around the edge portion of the bottom into the oven, air circulating means including ducts communicating respectively with the top of the oven and with said air chamber, and combustion means in heat exchange relation with the ducts and out of communication therewith for heating said air while maintaining the products of combustion out of communication with the air circulated through the ducts.

10. In a cook stove, the combination of an oven having surrounding walls and bottom, a separate air chamber beneath the oven, means for admitting air from said air chamber into the bottom portion of the oven at a plurality of sides adjacent the surrounding walls thereof, and means for withdrawing air from the upper portion of the oven and recirculating said air to said air chamber for upward flow through the oven, and means for heating the withdrawn air during the recirculation thereof to said air chamber.

11. In a cook stove, the combination of heating means including a combustion chamber, an oven having surrounding walls, top and bottom enclosing an oven chamber out of communication with the combustion chamber, a separate air chamber beneath the oven, means for admitting air from said air chamber into the oven adjacent the surrounding walls thereof, and means for withdrawing air at the upper portion of the oven and recirculating said air in heat exchange relation with the heating means and into the air chamber for upward flow through the oven.

12. In a cook stove, the combination of heating means including a combustion chamber having a smoke passage leading therefrom, an oven having surrounding walls, top and bottom enclosing an oven chamber out of communication with said smoke passage, a separate air chamber beneath the oven, means for admitting air from said air chamber into the oven adjacent the surrounding walls thereof, and means for withdrawing air from the upper portion of the oven and recirculating said air in heat exchange relation with the heating means and into the air chamber for upward flow through the oven.

13. In a cook stove, the combination of heating means including a combustion chamber having a smoke passage leading therefrom, an oven having surrounding walls, top and bottom enclosing an oven chamber out of communication with said smoke passage, said walls being insulated against heat exchange from the heating means directly into the oven, a separate air chamber beneath the oven, means for admitting air from said air chamber into the oven adjacent the surrounding walls thereof, and means for withdrawing air from the upper portion of the oven and recirculating said air in heat exchange relation with the heating means and into the air chamber for upward flow through the oven.

14. In a cook stove, the combination of heating means including a combustion chamber having a smoke passage leading therefrom, an oven having surrounding walls, top and bottom enclosing an oven chamber out of communication with said smoke passage, said walls being insulated against direct heat exchange from the heating means to the interior of the oven, a separate air chamber beneath the oven, means for admitting air from within said air chamber into the oven substantially at the surrounding walls thereof, means for withdrawing air from the top of the oven to a point externally of the insulation thereof into heat exchange relation with the heating means and into the air chamber for upward flow through the oven.

15. In a cook stove, the combination of heating means including a combustion chamber having a smoke passage leading therefrom, an oven having surrounding walls, top and bottom enclosing an oven chamber out of communication with said smoke passage, said combustion chamber extending substantially throughout the height of the oven beside said oven, the oven side adjacent the combustion chamber being spaced from the combustion chamber and insulated against direct heat exchange therebetween, means forming a heating chamber between said insulated wall and the combustion chamber, and means for circulating air out of one side of the oven through said heating chamber and into the opposite side of the oven.

16. In a cook stove, the combination of heating means including a combustion chamber having a smoke passage leading therefrom, an oven having surrounding walls, top and bottom, enclosing an oven chamber out of communication with said smoke passage, said combustion chamber extending throughout a substantial portion of the height of the oven beside said oven, the oven side adjacent the combustion chamber being insulated against direct heat exchange therebetween, means forming a heating chamber beside the heating means in heat exchange relation therewith and out of communication with the combustion chamber and smoke passage, and means for circulating air out of one side of the oven through said heating chamber and into the opposite side of the oven.

17. In a cook stove, the combination of heating means including a combustion chamber having a smoke passage leading therefrom, an oven having surrounding walls, top and bottom enclosing an oven chamber out of communication with said smoke passage, said oven having an outlet opening in one side thereof and having an inlet opening in the bottom thereof, said combustion chamber extending throughout a substantial portion of the height of the oven beside said oven, means forming a heating chamber beside the heating means in heat exchange relation therewith and out of communication with the combustion chamber and smoke passage, and power means for circulating air out of the outlet opening of the oven through said heating chamber and into the inlet opening of the oven.

18. In a cooking stove, the combination of heating means including a combustion chamber having a smoke passage leading therefrom, an oven having surrounding walls, top and bottom enclosing an oven chamber out of communication with said smoke passage, said oven chamber having an outlet opening in the upper one-third portion of the oven chamber and having an inlet opening in the lower one-third portion of the oven chamber, and means for circulating air out of the outlet opening of the oven chamber into heat exchange relation with the heating means and through the inlet opening into the bottom of the oven.

19. In a cooking stove, the combination of heating means including a combustion chamber having a smoke passage leading therefrom, an oven having surrounding insulated walls, top and bottom enclosing an oven chamber out of communication with the smoke passage, said oven chamber having an outlet opening in the upper one-third portion of the oven chamber and having an inlet opening in the lower one-third portion of the oven chamber, and means for circulating air through the outlet opening of the oven chamber into heat exchange relation with the heating means and through the inlet opening of the oven.

20. In a cooking stove, the combination of heating means including a combustion chamber having a smoke passage leading therefrom, an oven having surrounding insulated walls, top and bottom enclosing an oven chamber out of communication with the smoke passage, said oven chamber having an outlet opening above a horizontal plane through the oven which is located above the bottom of the oven chamber a distance which is at least two-thirds of the height of the oven chamber, and said oven chamber having an inlet opening located below another horizontal plane through the oven chamber which is located above the bottom of the oven a distance equal to one-third of the height of the oven, and power means for circulating air through the outlet opening of the oven chamber into heat exchange relation with the heating means and through the inlet opening of the oven chamber into the bottom thereof.

21. In a cooking stove, the combination of heating means including a combustion chamber having a smoke passage leading therefrom, an oven having surrounding insulated walls, top and bottom enclosing an oven chamber out of communication with said smoke passage, said oven chamber having an outlet opening in the upper one-third portion of the oven chamber and having an inlet opening in the lower one-third portion of the oven chamber, and power means for circulating air through the outlet opening of the oven chamber into heat exchange relation with the heating means and through the inlet opening of the oven.

22. In a cooking stove, the combination of heating means, an oven having surrounding walls, top and bottom enclosing an oven chamber, said oven chamber having an outlet opening in the upper one-third portion of the oven chamber and having an inlet opening in the lower one-third portion of the oven chamber, and means for circulating air through the outlet opening of the oven chamber into heat exchange relation with the heating means and through the inlet opening of the oven.

23. In a cooking stove having a cooking top, the combination of heating means including a combustion chamber having a vent passage leading therefrom, an oven having surrounding walls, top and bottom enclosing an oven chamber out of communication with said combustion chamber, said oven chamber having an outlet opening in the upper portion thereof and having an air inlet opening in the lower portion thereof, and means for circulating air from the outlet opening of the oven chamber into heat exchange relation with the heating means and through the inlet opening of the oven.

WILLIAM PORTER BIDDLE, Jr.
HUGH W. SANFORD.

REFERENCES CITED

The following references are of record in the file of this patent:

UNITED STATES PATENTS

| Number | Name | Date |
|---|---|---|
| 1,932,182 | Hogan | Oct. 24, 1933 |
| 1,950,212 | Barnett et al. | Mar. 6, 1934 |
| 550,865 | Cahoone | Dec. 3, 1895 |
| 2,264,525 | Hall | Dec. 2, 1941 |
| 2,133,184 | Burrow | Oct. 11, 1938 |
| 2,330,495 | Karges | Sept. 28, 1943 |
| 1,664,443 | Williams et al. | Apr. 3, 1938 |
| 2,128,698 | Ettl | Aug. 30, 1938 |
| 2,308,887 | McCollum | Jan. 19, 1943 |

FOREIGN PATENTS

| Number | Country | Date |
|---|---|---|
| 471,084 | British | Aug. 27, 1937 |
| 569,801 | German | Feb. 8, 1923 |